(12) United States Patent
Burk et al.

(10) Patent No.: US 8,957,174 B2
(45) Date of Patent: Feb. 17, 2015

(54) PROCESS FOR PREPARING AN AQUEOUS POLYMER DISPERSION

(75) Inventors: Yeni Burk, Ludwigshafen (DE); Timo Mangel, Oetigheim (DE); Reiner Liedy, Boehl-Iggelheim (DE); Martina Feil, Meckenheim (DE); Bogdan Moraru, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 62 days.

(21) Appl. No.: 13/618,442

(22) Filed: Sep. 14, 2012

(65) Prior Publication Data

US 2013/0079462 A1 Mar. 28, 2013

Related U.S. Application Data

(60) Provisional application No. 61/540,009, filed on Sep. 28, 2011.

(51) Int. Cl.
| | | |
|---|---|---|
| *C08F 230/08* | (2006.01) | |
| *C08L 43/04* | (2006.01) | |
| *C09D 143/04* | (2006.01) | |

(52) U.S. Cl.
CPC ................................. *C08F 230/08* (2013.01)
USPC ...... 526/279; 526/217; 526/318.44; 526/319; 524/556; 524/547

(58) Field of Classification Search
CPC ...... C08L 43/04; C09D 143/04; C08F 230/08
USPC .......... 524/556, 547; 526/279, 317.1, 318.44, 526/319
See application file for complete search history.

(56) References Cited

U.S. PATENT DOCUMENTS

| | | | |
|---|---|---|---|
| 2,520,959 | A | 9/1950 | Powers et al. |
| 3,397,165 | A | 8/1968 | Goodman et al. |
| 4,269,749 | A | 5/1981 | Marriott et al. |
| 5,100,948 | A | 3/1992 | Aydin et al. |
| 5,401,582 | A | 3/1995 | Weyland et al. |
| 6,096,858 | A | 8/2000 | Dobbelaar et al. |
| 6,365,709 | B1 | 4/2002 | Heibel et al. |
| 6,433,132 | B1 | 8/2002 | Wood et al. |
| 6,444,760 | B1 | 9/2002 | Rupaner et al. |
| 6,462,138 | B1 | 10/2002 | Rupaner et al. |
| 6,559,221 | B2 | 5/2003 | Sandor et al. |
| 6,875,406 | B1 | 4/2005 | Hübinger et al. |

FOREIGN PATENT DOCUMENTS

| | | |
|---|---|---|
| AU | 2005229399 | 10/2005 |
| CA | 2142160 | 9/1995 |
| DE | 40 03 422 A1 | 8/1991 |
| DE | 44 04 188 A1 | 8/1995 |
| DE | 196 24 299 A1 | 1/1997 |
| DE | 196 21 027 A1 | 11/1997 |
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| EP | 0 035 332 A2 | 9/1981 |
| EP | 0 366 969 A1 | 5/1990 |
| EP | 0 640 630 A1 | 3/1995 |
| EP | 0 771 328 | 5/1997 |
| EP | 1 147 139 A | 10/2001 |
| EP | 1 180 530 A2 | 2/2002 |
| EP | 1 209 210 A2 | 5/2002 |
| EP | 1 732 997 B1 | 12/2006 |
| EP | 1732997 B1 * | 10/2007 |
| JP | 05161869 A * | 6/1993 |
| WO | WO 95/33775 A1 | 12/1995 |
| WO | WO 00/37516 A1 | 6/2000 |
| WO | WO 2008/150647 A1 | 12/2008 |

OTHER PUBLICATIONS

International Search Report issued Oct. 10, 2012 in PCT/EP2012/067605 (with English translation of Category of Cited Documents).

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

A process for preparing an aqueous polymer dispersion of a polymer P by radically initiated aqueous emulsion polymerization of ethylenically unsaturated compounds, which comprises radically initiated aqueous emulsion polymerizing a monomer composition. The use of the aqueous polymer in tile adhesives is also provided.

15 Claims, No Drawings

PROCESS FOR PREPARING AN AQUEOUS POLYMER DISPERSION

The present invention provides a process for preparing an aqueous dispersion of a polymer P by radically initiated aqueous emulsion polymerization of ethylenically unsaturated compounds, which comprises using ≥0.1% and ≤5.0% by weight of at least one α,β-monoethylenically unsaturated $C_3$ to $C_6$ monocarboxylic or dicarboxylic acid and/or at least one α,β-monoethylenically unsaturated $C_3$ to $C_6$ monocarboxamide or dicarboxamide (monomers A), ≥0.1% and ≤5.0% by weight of at least one monoethylenically unsaturated compound containing silane groups (monomers B), ≥0.1% and ≤5.0% by weight of at least one hydroxyalkyl acrylate and/or hydroxyalkyl methacrylate (monomers C), ≥0% and ≤5.0% by weight of at least one crosslinking monomer having at least two nonconjugated ethylenically unsaturated groups (monomers D), ≥30% and ≤75% by weight of at least one ethylenically unsaturated monomer whose homopolymer has a glass transition temperature of ≤30° C. (monomers E) and which differs from the monomers A to D, and ≥20% and ≤69.7% by weight of at least one ethylenically unsaturated monomer whose homopolymer has a glass transition temperature of ≥50° C. (monomers F) and which differs from the monomers A to D, and the amounts of the monomers A to F adding up to 100% by weight.

The present invention further provides the aqueous polymer dispersions themselves that are obtainable by the process, and the polymer powders accessible from said dispersions, and also the use of the aqueous polymer dispersions and of the polymer powders in a very wide variety of different applications, especially as an essential component in tile adhesives.

The prior-art starting point in the context of the use of polymers based on aqueous polymer dispersions for producing tile adhesives is as follows.

Thus, EP-A 35332 discloses the use of aqueous polymer dispersions whose polymers comprise up to 10% by weight of ethylenically unsaturated acids and also 0.1% to 1.0% by weight of ethylenically unsaturated silicon compounds in copolymerized form as water-resistant adhesives for ceramic tiles.

EP-A 366969 relates to sealants and adhesives for ceramic tiles with good wet adhesion, comprising as essential components polymeric particles which are present in aqueous dispersion and which necessarily comprise 0.1% to 4% by weight of a saturated mercaptosilane.

EP-A 640630 describes silicon-modified, aqueous polymeric dispersions for use in adhesives with improved wet adhesion, prepared using not only vinylsilanes and hardening and softening monomers but also ethylenically unsaturated carboxylic acid and the amides thereof.

EP-A 1147139 describes aqueous copolymer dispersions which consist essentially of an aqueous dispersion of a specific copolymer necessarily comprising, in addition to the alkyl esters of ethylenically unsaturated carboxylic acids and vinylaromatic compounds that function as principal monomers, also 0.05% to 10% by weight each of ethylenically unsaturated carboxylic acids and/or amides thereof, and crosslinking, ethylenically unsaturated compounds, and also, optionally, further ethylenically unsaturated compounds, in copolymerized form. The coatings obtained with the stated aqueous copolymer dispersions are said to exhibit low water absorbency and also good elongation at break and good relaxation after defined elongation.

Silicon-containing polymer dispersions and the use thereof for producing water-resistant and heat-stable coatings, seals, and adhesive bonds, such as tile bonds in particular, are disclosed in EP-A 1180530. As well as the polymers containing hydrolyzable silane groups, the aqueous polymer dispersion necessarily further comprises compounds having urea groups or thiourea groups.

EP-A 1732997 describes low-odor binder polymers which can be processed solventlessly, and the use thereof in coating materials. The polymers disclosed are by polymerizing a monomer mixture consisting of 2-ethylhexyl acrylate, at least one monomer whose homopolymer has a glass transition temperature of >50° C., at least one monomer containing acid groups, and also, optionally, at least one monomer whose homopolymer has a glass transition temperature of <10° C. and/or a monomer which has at least one hydroxyl, keto and/or silane group in the side chain.

Nevertheless, the aqueous binder systems of the prior art are unable to provide full satisfaction in terms of all application-relevant properties, such as, more particularly, the processing life available (open time), the adhesion of ceramic tiles to surfaces, and the shear strength of the binder systems after water storage.

It was an object of the present invention, therefore, to provide aqueous polymer dispersions which when used as an ingredient of a tile adhesive ensure a prolonged processing life, a higher level of adhesion of ceramic tiles to surfaces, and also an improved shear strength following water storage of the bonded tiles.

This object has been achieved by means of an aqueous polymer dispersion obtainable in accordance with the process defined at the outset.

The aqueous dispersion of a polymer P (aqueous polymer P dispersion) is obtained by radically initiated aqueous emulsion polymerization of ≥0.1% and ≤5.0% by weight of at least one monomer A,
≥0.1% and ≤5.0% by weight of at least one monomer B,
≥0.1% and ≤5.0% by weight of at least one monomer C,
≥0% and ≤5.0% by weight of at least one monomer D,
≥30% and ≤75% by weight of at least one monomer E, and
≥20% and ≤69.7% by weight of at least one monomer F,
the amounts of the monomers A to F adding up to 100% by weight.

The implementation of radically initiated emulsion polymerizations of ethylenically unsaturated monomers in an aqueous medium has been described many times before and is therefore sufficiently well-known to the skilled person [in this regard cf. Emulsion Polymerization in Encyclopedia of Polymer Science and Engineering, vol. 8, pages 659 ff. (1987); D. C. Blackley, in High Polymer Lattices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerization, Interscience Publishers, New York (1965); DE-A 40 03 422; and Dispersionen synthetischer Hochpolymerer, F. Hölscher, Springer-Verlag, Berlin (1969)]. The radically initiated aqueous emulsion polymerization customarily takes place such that the ethylenically unsaturated monomers are dispersed in the aqueous medium, generally with additional use of dispersing assistants, such as emulsifiers and/or protective colloids, and are polymerized by means of at least one water-soluble radical polymerization initiator. In the resultant aqueous polymer dispersions, the residual levels of unreacted ethylenically unsaturated monomers are frequently lowered by chemical and/or physical methods likewise known to the skilled person [see, for example, EP-A 771328, DE-A 19624299, DE-A 19621027, DE-A 19741184, DE-A 19741187, DE-A 19805122, DE-A 19828183, DE-A 19839199, DE-A 19840586, and 19847115], the polymer solids content is adjusted to a desired level by dilution or concentration, or other customary adjuvants, such as, for example, bactericides, foam-modifying or viscosity-modifying additives, are added to the aqueous polymer dispersion. The preparation of an aqueous dispersion of the polymer P differs from this general procedure only in the specific use of the aforementioned monomers A to F. It is self-evident here that with regard to the preparation of the polymer P in the context of the present specification, the intention is also that the seed, staged, and gradient regimes familiar to the skilled person are also encompassed.

Monomers A contemplated include $\alpha,\beta$-monoethylenically unsaturated $C_3$ to $C_6$, preferably $C_3$ or $C_4$, monocarboxylic or dicarboxylic acids such as, for example, acrylic acid, methacrylic acid, ethylacrylic acid, itaconic acid, allylacetic acid, crotonic acid, vinylacetic acid, fumaric acid, maleic acid, and 2-methylmaleic acid. The monomers A also, however, comprise the anhydrides of corresponding $\alpha,\beta$-monoethylenically unsaturated dicarboxylic acids, such as, for example, maleic anhydride or 2-methylmaleic anhydride. The monomer A containing acid groups is preferably selected from the group encompassing acrylic acid, methacrylic acid, crotonic acid, fumaric acid, maleic acid, maleic anhydride, 2-methylmaleic acid, and itaconic acid, with acrylic acid, methacrylic acid and/or itaconic acid being particularly preferred. It will be appreciated that the monomers A also encompass the fully or partly neutralized, water-soluble salts, more particularly the alkali metal salts or ammonium salts, of the aforementioned acids.

Further contemplated as monomers A are all $\alpha,\beta$-monoethylenically unsaturated $C_3$ to $C_6$ monocarboxamides or dicarboxamides. Likewise included in monomers A are the aforementioned compounds whose carboxamide group is substituted by an alkyl group or by a methylol group. Examples of such monomers A are the amides and diamides, respectively, of the $\alpha,\beta$-monoethylenically unsaturated $C_3$ to $C_6$, preferably $C_3$ or $C_4$, monocarboxylic or dicarboxylic acids, such as, for example, acrylamide, methacrylamide, ethylacrylamide, itaconic monoamide or diamide, allylacetamide, crotonic monoamide or diamide, vinylacetamide, fumaric monoamide or diamide, maleic monoamide or diamide, and 2-methylmaleic monoamide or diamide. Examples of $\alpha,\beta$-monoethylenically unsaturated $C_3$ to $C_6$ monocarboxamides or dicarboxamides whose carboxamide groups are substituted by an alkyl group or by a methylol group are N-alkylacrylamides and -methacrylamides, such as, for example, N-tert-butylacrylamide and -methacrylamide, N-methylacrylamide and -methacrylamide, and N-methylolacrylamide and N-methylolmethacrylamide. Preferred amidic monomers A are acrylamide, methacrylamide, N-methylolacrylamide and/or N-methylolmethacrylamide, with methylolacrylamide and/or N-methylolmethacrylamide being particularly preferred.

Preferred as monomers A, however, are acrylic acid, methacrylic acid, crotonic acid, fumaric acid, maleic acid, maleic anhydride, 2-methylmaleic acid and/or itaconic acid, with acrylic acid and/or methacrylic acid being particularly preferred.

The amount of monomers A used in accordance with the process is $\geq 0.1\%$ and $\leq 5.0\%$ by weight, preferably $\geq 0.5\%$ and $\leq 3.0\%$ by weight, and with more particular preference $\geq 1.0\%$ and $\leq 2.5\%$ by weight.

Monomers B contemplated include all monoethylenically unsaturated compounds containing silane groups. With particular advantage the monomers B have a hydrolyzable silane group. Hydrolyzable silane groups advantageously comprise at least one alkoxy group or a halogen atom, such as chlorine, for example. Monomers B that can be used with advantage in accordance with the invention are disclosed in WO 2008/150647, page 9, lines 5 to 25. By virtue of their express referencing, these monomers B are regarded as part of the present description. With particular advantage, however, the monomer B is selected from the group encompassing vinyltriacetoxysilane, 3-methacryloxypropyltrimethylsilane and vinyltriethoxysilane.

The amount of monomers B used in accordance with the process is $\geq 0.1\%$ and $\leq 5.0\%$ by weight, preferably $\geq 0.5\%$ and $\leq 2.0\%$ by weight, and with more particular preference $\geq 0.5\%$ and $\leq 1.5\%$ by weight.

As monomers C it is possible in principle to use all hydroxyalkyl, advantageously hydroxy-$C_2$-$C_{10}$ alkyl, preferably hydroxy-$C_2$-$C_4$ alkyl, and with particular advantage hydroxy-$C_2$-$C_3$ alkyl acrylates and/or methacrylates, where in the context of this specification the alkoxylated hydroxyalkyl acrylates and/or methacrylates, i.e., those reacted with alkylene oxides (essentially ethylene oxide and propylene oxide), are also regarded as being monomers C. The at least one monomer C is with advantage selected from the group encompassing diethylene glycol monoacrylate, 4-hydroxybutyl acrylate, 3-hydroxypropyl acrylate, 2-hydroxypropyl acrylate, 2-hydroxyethyl acrylate, diethylene glycol monomethacrylate, 4-hydroxybutyl methacrylate, 3-hydroxypropyl methacrylate, 2-hydroxypropyl methacrylate, and 2-hydroxyethyl methacrylate. With particular advantage use is made of 2-hydroxyethyl acrylate and/or 2-hydroxyethyl methacrylate, with 2-hydroxyethyl acrylate being particularly preferred.

The amount of monomers C used in accordance with the process is $\geq 0.1\%$ and $\leq 5.0\%$ by weight, preferably $\geq 0.5\%$ and $\leq 3.0\%$ by weight, and with more particular preference $\geq 0.5\%$ and $\leq 2.0\%$ by weight.

Monomers D contemplated include all compounds which contain at least two nonconjugated ethylenically unsaturated groups. Examples of such are monomers containing two vinyl radicals, monomers containing two vinylidene radicals, and monomers containing alkenyl radicals. Particularly advantageous in this context are the diesters of dihydric alcohols with $\alpha,\beta$-monoethylenically unsaturated monocarboxylic acids, among which acrylic acid and methacrylic acid are preferred. Examples of such monomers containing two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, triesters of trihydric alcohols with $\alpha,\beta$-monoethylenically unsaturated monocarboxylic acids, such as, for example, glycerol triacrylate, glycerol trimethacrylate, trimethylolpropane triacrylate, trimethylolpropane trimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. Especially preferred are 1,4-butylene glycol diacrylate, allyl methacrylate and/or divinylbenzene.

The amount of monomers D used in accordance with the process is ≥0% and ≤5.0% by weight, and preferably ≥0% and ≤1.0% by weight.

Monomers E contemplated include all ethylenically unsaturated monomers whose homopolymers have a glass transition temperature of ≤30° C. and which differ from the monomers A to D. Examples of suitable monomers E are conjugated aliphatic $C_4$ to $C_9$ diene compounds, esters of vinyl alcohol and a $C_1$ to $C_{10}$ monocarboxylic acid, $C_1$ to $C_{10}$ alkyl acrylate, $C_5$ to $C_{10}$ alkyl methacrylate, $C_5$ to $C_{10}$ cycloalkyl acrylate and methacrylate, $C_1$ to $C_{10}$ dialkyl maleate, and/or $C_1$ to $C_{10}$ dialkyl fumarate, vinyl ethers of $C_3$ to $C_{10}$ alkanols, branched and unbranched $C_3$ to $C_{10}$ olefins. It is advantageous to use those monomers E whose homopolymers have Tg values of <0° C. Use with particular advantage as monomers E are vinyl acetate, ethyl acrylate, n-propyl acrylate, n-butyl acrylate, isobutyl acrylate, sec-butyl acrylate, n-hexyl acrylate, 2-ethylhexyl acrylate, n-hexyl methacrylate, 2-ethylhexyl methacrylate, di-n-butyl maleate, di-n-butyl fumarate, with 2-ethylhexyl acrylate, n-butyl acrylate, 1,4-butadiene and/or ethyl acrylate being especially preferred.

The amount of monomers E used in accordance with the process is ≥30% and ≤75% by weight, preferably ≥40% and ≤65% by weight, and with more particular preference ≥45% and ≤60% by weight.

Monomers F contemplated include all ethylenically unsaturated monomers whose homopolymers have a glass transition temperature of ≥50° C. and which differ from the monomers A to D. Examples of suitable monomers F are vinylaromatic monomers, $C_1$ to $C_4$ alkyl methacrylates, and ethylenically unsaturated nitrile compounds. Vinylaromatic monomers are understood to include in particular derivatives of styrene or of α-methylstyrene in which the phenyl rings are substituted optionally by 1, 2 or 3 $C_1$ to $C_4$ alkyl groups, halogen, more particularly bromine or chlorine, and/or methoxy groups. The ethylenically unsaturated nitrile compounds are essentially the nitriles which derive from the aforementioned α,β-monoethylenically unsaturated, especially $C_3$ to $C_6$, preferably $C_3$ to $C_4$, monocarboxylic or dicarboxylic acids, such as, for example, acrylonitrile, methacrylonitrile, maleonitrile and/or fumaronitrile, with acrylonitrile and/or methacrylonitrile being particularly preferred. Preferred monomers are those whose homopolymers have a glass transition temperature of ≥80° C. Particularly preferred monomers are styrene, α-methylstyrene, o- or p-vinyltoluene, p-acetoxystyrene, p-bromostyrene, p-tert-butylstyrene, o-, m- or p-chlorostyrene, methyl methacrylate, tert-butyl acrylate, tert-butyl methacrylate, ethyl methacrylate, isobutyl methacrylate, n-hexyl acrylate, cyclohexyl methacrylate, acrylonitrile, methacrylonitrile, but also, for example, tert-butyl vinyl ether or cyclohexyl vinyl ether, but with methyl methacrylate, styrene and/or tert-butyl methacrylate being especially preferred.

The amount of monomers F used in accordance with the process is ≥20% and ≤69.7% by weight, preferably ≥30% and ≤58.5% by weight, and with more particular preference ≥30% and ≤53% by weight.

The at least one monomer E is with advantage selected from the group encompassing conjugated aliphatic $C_4$ to $C_9$ diene compound, esters of vinyl alcohol and a $C_1$ to $C_{10}$ monocarboxylic acid, $C_1$ to $C_{10}$ alkyl acrylate, $C_5$ to $C_{10}$ alkyl methacrylate, $C_5$ to $C_{10}$ cycloalkyl acrylate and methacrylate, $C_1$ to $C_{10}$ dialkyl maleate, and $C_1$ to $C_{10}$ dialkyl fumarate, and the at least one monomer F is with advantage selected from the group encompassing vinylaromatic monomer and $C_1$ to $C_4$ alkyl methacrylate, with 2-ethylhexyl acrylate, n-butyl acrylate, and/or ethyl acrylate being especially preferred as monomers E, and with methyl methacrylate, styrene and/or tert-butyl methacrylate being especially preferred as monomers F.

The glass transition temperature, Tg, refers in the context of this specification to the limiting value of the glass transition temperature, toward which the latter tends with increasing molecular weight according to G. Kanig (Kolloid-Zeitschrift & Zeitschrift für Polymere, vol. 190, page 1, equation 1). The Tg is determined by the DSC method (Differential Scanning calorimetry, 20 K/min, midpoint measurement, DIN 53 765). The Tg values for homopolymers of the majority of monomers are known and are listed for example in Ullmann's Encyclopedia of Industrial Chemistry, VCH Weinheim, 1992, vol. 5, vol. A21, p. 169; other sources of glass transition temperatures of homopolymers include, for example, J. Brandrup, E. H. Immergut, Polymer Handbook, 1st Ed., J. Wiley, New York 1966, 2nd Ed. J. Wiley, New York 1975, and 3rd Ed., J. Wiley, New York 1989.

$C_1$ to $C_{10}$ alkyl groups are to be taken in the context of this specification to mean linear or branched alkyl radicals having 1 to 10 carbon atoms, as for example methyl, ethyl, n-propyl, isopropyl, n-butyl, sec-butyl, isobutyl, tert-butyl, n-pentyl, isopentyl, tert-pentyl n-hexyl, 2-ethylhexyl, n-nonyl or n-decyl. $C_5$ to $C_{10}$ cycloalkyl groups are preferably cyclopentyl or cyclohexyl groups, which may optionally be substituted by 1, 2 or 3 $C_1$ to $C_4$ alkyl groups.

The aqueous polymer P dispersion is prepared using advantageously

≥0.5% and ≤3.0% by weight of at least one monomer A,
≥0.5% and ≤2.0% by weight of at least one monomer B,
≥0.5% and ≤3.0% by weight of at least one monomer C,
≥0% and ≤1.0% by weight of at least one monomer D,
≥40% and ≤65% by weight of at least one monomer E, and
≥30% and ≤58.5% by weight of at least one monomer F and with particular advantage ≥1.0% and ≤2.5% by weight of at least one monomer A,
≥0.5% and ≤1.5% by weight of at least one monomer B,
≥0.5% and ≤2.0% by weight of at least one monomer C,
≥0% and ≤1.0% by weight of at least one monomer D,
≥45% and ≤60% by weight of at least one monomer E, and
≥30% and ≤53% by weight of at least one monomer F where ≥1.0% and ≤2.5% by weight of acrylic acid and/or methacrylic acid,
≥0.5% and ≤1.5% by weight of vinyltriacetoxysilane, 3-methacryloyloxypropyltrimethylsilane and/or vinyltriethoxysilane,
≥0.5% and ≤2.0% by weight of 2-hydroxyethyl acrylate and/or 2-hydroxyethyl methacrylate,
≥45% and ≤60% by weight of 2-ethylhexyl acrylate, n-butyl acrylate and/or ethyl acrylate, and
≥30% and ≤53% by weight of methyl methacrylate, styrene and/or tert-butyl methacrylate are used with particular preference.

It is important that in the context of this specification the proportions of monomers used for preparing the polymer P are intended to correspond to the fraction of these monomers in the polymerized polymer P.

The polymers P obtained by the process of the invention can in principle have glass transition temperatures Tg in the range of ≥−70 and ≤150° C. With advantage, the monomers A, B, C, E and F are selected, in nature and amount, such that the polymers prepared solely from them have a glass transition temperature Tg in the range of ≥50 and ≤70° C. and advantageously in the range of ≥−20 and ≤30° C.

According to Fox (T. G. Fox, Bull. Am. Phys. Soc. 1956 [Ser. II] 1, page 123 and in accordance with Ullmann's Encyclopädie der technischen Chemie, vol. 19, page 18, 4th edition, Verlag Chemie, Weinheim, 1980) the glass transition temperature of copolymers with no more than low levels of crosslinking is given in good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_h^n$ are the glass transition temperatures of the polymers formed in each case only from one of the monomers 1, 2, . . . n, in degrees Kelvin. The glass transition temperatures of these homopolymers of the majority of ethylenically unsaturated monomers are known (or can be determined experimentally in a simple manner known per se) and are listed for example in J. Brandrup, E. H. Immergut, Polymer Handbook 1st ed., J. Wiley, New York, 1966, 2nd ed., J. Wiley, New York, 1975, and 3rd ed., J. Wiley, New York, 1989, and also in Ullmann's Encyclopedia of Industrial Chemistry, page 169, Verlag Chemie, Weinheim, 1992.

It is essential that the radically initiated aqueous emulsion polymerization of the invention can also take place in the presence of a polymer seed, such as in the presence of 0.01% to 3%, frequently of 0.02% to 2%, and often of 0.04% to 1.5% by weight of a polymer seed, based in each case on the total monomer amount.

A polymer seed is used particularly when the particle size of the polymer particles to be prepared by means of a radically aqueous emulsion polymerization is to be set in a controlled way (in this regard see, for example, U.S. Pat. No. 2,520,959 and U.S. Pat. No. 3,397,165).

Use is made in particular of a polymer seed whose particles have a narrow size distribution and weight-average diameters $D_w \leq 100$ nm, frequently $\geq 5$ nm to $\leq 50$ nm, and often $\geq 15$ nm to $\leq 35$ nm. Determination of the weight-average particle diameters is known to the skilled person and is accomplished, for example, via the method of the analytical ultracentrifuge. By weight-average particle diameter in this specification is meant the weight-average $D_{w50}$ value determined by the method of the analytical ultracentrifuge (cf. in this regard S. E. Harding et al., Analytical Ultracentrifugation in Biochemistry and Polymer Science, Royal Society of Chemistry, Cambridge, Great Britain 1992, chapter 10, Analysis of Polymer Dispersions with an Eight-Cell AUC Multiplexer: High Resolution Particle Size Distribution and Density Gradient Techniques, W. Mächtle, pages 147 to 175).

A particle size distribution is considered narrow for the purposes of this specification when the ratio of the weight-average particle diameter $D_{w50}$ to the number-average particle diameter $D_{n50}$ $[D_{w50}/D_{n50}]$ as determined by the method of the analytical ultracentrifuge is <2.0, preferably <1.5, and more preferably <−1.2 or <1.1.

The polymer seed is customarily used in the form of an aqueous polymer dispersion. The aforementioned quantities refer to the polymer solids fraction of the aqueous polymer seed dispersion.

Where a polymer seed is used it is advantageous to employ an exogenous polymer seed. Unlike an in situ polymer seed, which is prepared in the reaction vessel before the actual emulsion polymerization is commenced, and which generally has the same monomeric composition as the polymer prepared by the subsequent radically initiated aqueous emulsion polymerization, an exogenous polymer seed is a polymer seed which has been prepared in a separate reaction step and whose monomeric composition is different than that of the polymer prepared by the radically initiated aqueous emulsion polymerization, although this means nothing more than that different monomers, or monomer mixtures with a different composition, are used for preparing the exogenous polymer seed and for preparing the aqueous polymer dispersion. The preparation of an exogenous polymer seed is familiar to the skilled person and is typically accomplished by the introduction as initial charge to a reaction vessel of a relatively small amount of monomers and of a relatively large amount of emulsifiers, and by the addition at reaction temperature of a sufficient amount of polymerization initiator.

It is preferred in accordance with the invention to use an exogenous polymer seed having a glass transition temperature of $\geq 50°$ C., frequently $\geq 60°$ C. or $\geq 70°$ C., and often $\geq 80°$ C. or $\geq 90°$ C. A polystyrene or polymethyl methacrylate polymer seed is particularly preferred.

The total amount of exogenous polymer seed can be introduced as initial charge to the polymerization vessel. An alternative option is to introduce only a portion of the exogenous polymer seed as initial charge to the polymerization vessel, and to add the remaining amount during the polymerization; together with the monomers A to F. If necessary, however, the total amount of polymer seed can also be added in the course of the polymerization. It is preferred to introduce the total amount of exogenous polymer seed as initial charge to the polymerization vessel before the polymerization reaction is initiated.

For preparing the aqueous polymer P dispersion of the invention it is possible for the total amount of the monomers A to F (total monomer amount) to be introduce as initial charge to the aqueous reaction medium before the polymerization reaction is initiated. It is also possible, however, to introduce optionally only a portion of the monomers A to F as initial charge to the aqueous reaction medium before the polymerization reaction is initiated, and then, following initiation of the polymerization, under polymerization conditions, during the radical emulsion polymerization, to add the total amount or the optionally remaining, in accordance with the rate of consumption, continuously, with consistent or varying volume flow rates, or discontinuously. It is of course also possible to add the total amount of monomer to the aqueous medium under polymerization conditions. In that case the metering of each of the monomers A to F may take place in the form of separate, individual streams, as inhomogeneous or homogeneous (sub-)mixtures or as a monomer emulsion. The monomers A to F are metered advantageously in the form of a monomer mixture, more particularly in the form of an aqueous monomer emulsion.

For preparing the aqueous polymer P dispersion used in accordance with the invention, the assistants used include dispersing assistants, which hold the monomer droplets and the resultant polymer particles in disperse distribution in the aqueous medium and hence ensure the stability of the aqueous polymer P dispersion produced. Dispersing assistants contemplated include not only the protective colloids commonly used for implementing radical aqueous emulsion polymerizations but also emulsifiers.

Examples of suitable protective colloids are polyvinyl alcohols, polyalkylene glycols, alkali metal salts of polyacrylic acids and polymethacrylic acids, gelatin derivatives, or acrylic acid, methacrylic acid, maleic anhydride, 2-acrylamido-2-methylpropanesulfonic acid and/or 4-styrenesulfonic acid copolymers and their alkali metal salts, and also homopolymers and copolymers of N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-bearing acrylates, methacrylates, acrylamides and/or methacrylamides. A detailed description of further suitable protective colloids is found in Houben- Weyl, Methoden der organischen Chemie, vol. XIV/1, Makromolekulare Stoffe [Macromolecular compounds], Georg-Thieme-Verlag, Stuttgart, 1961, pages 411 to 420.

It will be appreciated that mixtures of protective colloids and/or emulsifiers can also be used. Use is frequently made as dispersing assistants exclusively of emulsifiers, whose relative molecular weights, unlike those of the protective colloids, are usually below 1000. They may be anionic, cationic or nonionic in nature. It will be appreciated that, where mixtures of surface-active substances are used, the individual components must be compatible with one another, something which in case of doubt can be ascertained by means of a few preliminary tests. Generally speaking, anionic emulsifiers are compatible with one another and with nonionic emulsifiers. The same is true of cationic emulsifiers, whereas anionic and cationic emulsifiers are normally not compatible with one another. An overview of suitable emulsifiers is found in Houben-Weyl, Methoden der organischen Chemie, vol. XIV/1, Makromolekulare Stoffe [Macromolecular compounds], Georg-Thieme-Verlag, Stuttgart, 1961, pages 192 to 208.

However, particularly emulsifiers are used as dispersing assistants.

Examples of customary nonionic emulsifiers include ethoxylated mono-, di-, and tri-alkylphenols (EO degree: 3 to 50, alkyl radical: $C_4$ to $C_{12}$) and also ethoxylated fatty alcohols (EO degree: 3 to 80; alkyl radical: $C_8$ to $C_{36}$). Examples thereof are the Lutensol® A grades ($C_{12}C_{14}$ fatty alcohol ethoxylates, EO degree: 3 to 8), Lutensol® AO grades ($C_{13}C_{15}$ oxo-process alcohol ethoxylates, EO degree: 3 to 30), Lutensol® AT grades ($C_{16}C_{18}$ fatty alcohol ethoxylates, EO degree: 11 to 80), Lutensol® ON grades ($C_{10}$ oxo-process alcohol ethoxylates, EO degree: 3 to 11), and Lutensol® TO grades ($C_{13}$ oxo-process alcohol ethoxylates, EO degree: 3 to 20), all from BASF SE.

Examples of customary anionic emulsifiers include alkali metal salts and ammonium salts of alkyl sulfates (alkyl radical: $C_8$ to $C_{12}$), of sulfuric monoesters with ethoxylated alkanols (EO degree: 4 to 30, alkyl radical: $C_{12}$ to $C_{18}$) and with ethoxylated alkylphenols (EO degree: 3 to 50, alkyl radical: $C_4$ to $C_{12}$), of alkylsulfonic acids (alkyl radical: $C_{12}$ to $C_{18}$), and of alkylarylsulfonic acids (alkyl radical: $C_9$ to $C_{18}$).

Of proven suitability as further anionic emulsifiers are, furthermore, compounds of the general formula (I)

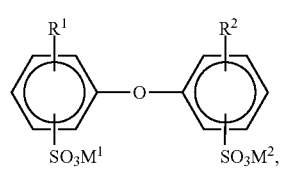

(I)

in which $R^1$ and $R^2$ are H atoms or $C_4$ to $C_{24}$ alkyl and are not simultaneously H atoms, and $M^1$ and $M^2$ can be alkali metal ions and/or ammonium ions. $R^1$ and $R^2$ in the general formula (I) are preferably linear or branched alkyl radicals with 6 to 18 carbon atoms, in particular with 6, 12, and 16 carbon atoms, or hydrogen, $R^1$ and $R^2$ not both simultaneously being H atoms. $M^1$ and $M^2$ are preferably sodium, potassium or ammonium, with sodium being particularly preferred.

Particularly advantageous compounds (I) are those in which $M^1$ and $M^2$ are sodium, $R^1$ is a branched alkyl radical with 12 carbon atoms, and $R^2$ is an H atom or $R^1$. Frequently use is made of technical mixtures which contain a fraction of 50% to 90% by weight of the monoalkylated product, such as Dowfax® 2A1 (brand name of the Dow Chemical Company). The compounds (I) are common knowledge, from U.S. Pat. No. 4,269,749 for example, and are available commercially.

Suitable cation-active emulsifiers are in general $C_6$ to $C_{18}$ alkyl-, $C_6$ to $C_{18}$ alkylaryl- or heterocycle-containing, primary, secondary, tertiary or quaternary ammonium salts, alkanolammonium salts, pyridinium salts, imidazolinium salts, oxazolinium salts, morpholinium salts, thiazolinium salts, and also salts of amine oxides, quinolinium salts, isoquinolinium salts, tropylium salts, sulfonium salts, and phosphonium salts. Mention may be made by way of example of dodecylammonium acetate or the corresponding sulfate, the sulfates or acetates of the various 2-(N,N,N-trimethylammonium)ethyl paraffin esters, N-cetylpyridinium sulfate, N-laurylpyridinium sulfate, and also N-cetyl-N,N,N-trimethylammonium sulfate, N-dodecyl-N,N,N-trimethylammonium sulfate, N-octyl-N,N,N-trimethylammonium sulfate, N,N-distearyl-N,N-dimethylammonium sulfate, and also the gemini surfactant N,N'-(lauryldimethypethylenediamine disulfate, ethoxylated tallowalkyl-N-methylammonium sulfate, and ethoxylated oleylamine (for example, Uniperol® AC from BASF SE, approximately 11 ethylene oxide units). Numerous further examples are found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. Minimal nucleophilicity in the anionic countergroups is favorable, appropriate examples being perchlorate, sulfate, phosphate, nitrate, and carboxylates, such as acetate, trifluoroacetate, trichloroacetate, propionate, oxalate, citrate, and benzoate, and, also conjugated anions of organic sulfonic acids, such as methylsulfonate, trifluoromethylsulfonate, and para-toluenesulfonate, for example, and additionally tetrafluoroborate, tetraphenylborate, tetrakis(pentafluorophenyl)borate, tetrakis[bis(3,5-trifluoromethyl)phenyl]borate, hexafluorophosphate, hexafluoroarsenate or hexafluoroantimonate.

The emulsifiers used with preference as dispersing assistants are employed advantageously in a total amount of ≥0.005 and ≤10%, preferably ≥0.01 and ≤5%, in particular ≥0.1 and ≤3% by weight, based in each case on the total amount of monomer.

The total amount of protective colloids used in addition to or in place of the emulsifiers as dispersing assistants is often ≥0.1 and ≤40% and frequently ≥0.2 and ≤25% by weight, based in each case on the total amount of monomer.

It is preferred, however, to use anionic and/or nonionic emulsifiers, and more preferably anionic emulsifiers, as dispersing assistants.

For preparing the polymer P dispersion of the invention, the total amount of the dispersing assistant can be introduced as initial charge to the aqueous reaction medium before the polymerization reaction is initiated. It is also possible, however, optionally to introduce only a portion of the dispersing assistant as initial charge to the aqueous reaction medium before the polymerization reaction is initiated, and then to add the total amount or the optionally remaining amount of the dispersing assistant continuously or discontinuously, under polymerization conditions, during the radical emulsion polymerization. The major amount or the total amount of dispersing assistant is preferably added in the form of an aqueous monomer emulsion.

The radically initiated aqueous emulsion polymerization is set off by means of a radical polymerization initiator (free-radical initiator). Such initiators may in principle be peroxides and also azo compounds. It will be appreciated that redox initiator systems are also contemplated. Peroxides used can in principle be inorganic peroxides, such as hydrogen peroxide or peroxodisulfates, such as the mono- or di-alkali metal or -ammonium salts of peroxodisulfuric acid, examples being their mono- and di-sodium, -potassium or -ammonium salts, or organic peroxides, such as alkyl hydroperoxides, examples being tert-butyl, p-menthyl or cumyl hydroperoxide, and also dialkyl or diaryl peroxides, such as di-tert-butyl or dicumyl peroxide. Azo compounds that find use are substantially 2,2'-azobis(isobutyronitrile), 2,2'-azobis(2,4-dimethylvaleronitrile), and 2,2'-azobis(amidinopropyl) dihydrochloride (AIBA, corresponding to V-50 from Wako Chemicals). Suitable oxidants for redox initiator systems are substantially the abovementioned peroxides. As corresponding reductants it is possible to employ compounds of sulfur in a low oxidation state, such as alkali metal sulfites, examples being potassium and/or sodium sulfite, alkali metal hydrogen sulfites, examples being potassium and/or sodium hydrogen sulfite, alkali metal metabisulfites, examples being potassium and/or sodium metabisulfite, formaldehyde-sulfoxylates, examples being potassium and/or sodium formaldehyde sulfoxylate, alkali metal salts, especially potassium and/or sodium salts, aliphatic sulfinic acids, and alkali metal hydrogen sulfides, such as potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone. In general the amount of free-radical initiator used, based on the total amount of monomer, is 0.01% to 5%, preferably 0.1% to 3%, and more preferably 0.1% to 2% by weight.

For preparing the polymer P dispersion of the invention, the total amount of the free-radical initiator can be introduced as initial charge to the aqueous reaction medium before the polymerization reaction is initiated. It is possible, however, to introduce, optionally, only a portion of the free-radical initiator as initial charge to the aqueous reaction medium before the polymerization reaction is initiated, and then to add the total amount or the optionally remaining amount continuously or discontinuously, at the rate of consumption, under polymerization conditions, during the radical emulsion polymerization.

The initiation of the polymerization reaction means the start of the polymerization reaction of the monomers present in the polymerization vessel, after the free-radical initiator has formed radicals. This initiation of the polymerization reaction may take place by addition of free-radical initiator to the aqueous polymerization mixture in the polymerization vessel under polymerization conditions. It is, however, also possible for a portion or the total amount of the free-radical initiator to be added to the aqueous polymerization mixture, comprising the monomers initially introduced, in the polymerization vessel under conditions not suitable for setting off a polymerization reaction, such as low temperature, for example, and subsequently bring about polymerization conditions in the aqueous polymerization mixture. By polymerization conditions here are meant, generally, those temperatures and pressures under which the radically initiated aqueous emulsion polymerization proceeds at a sufficient polymerization rate. They are dependent in particular on the free-radical initiator used. The nature and amount of the free-radical initiator, the polymerization temperature, and the polymerization pressure are advantageously selected such that the free-radical initiator has a half-life <3 hours, with particular advantage <1 hour, and with very particular advantage <30 minutes, while continually providing initiating radicals to a sufficient extent to initiate and maintain the polymerization reaction.

Reaction temperature contemplated for the radically initiated aqueous emulsion polymerization encompasses the whole range from 0 to 170° C. It is usual to employ temperatures of 50 to 120° C., preferably 60 to 110° C., and more preferably 70 to 95° C. The radical aqueous emulsion polymerization can be carried out at a pressure less than, equal to or greater than 1 atm [1.013 bar (absolute), atmospheric pressure], so that the polymerization temperature may exceed 100° C. and may be up to 170° C. In the presence of monomers A to F with a low boiling point, the emulsion polymerization is conducted preferably under increased pressure. This pressure may adopt values of 1.2, 1.5, 2, 5, 10 or 15 bar (absolute) or even higher. Where the emulsion polymerization is carried out at subatmospheric pressure, pressures of 950 mbar, frequently of 900 mbar and often 850 mbar (absolute), are brought about. The radical aqueous emulsion polymerization is carried out advantageously at 1 atm in the absence of oxygen, more particularly under an inert gas atmosphere, such as under nitrogen or argon, for example.

With particular advantage the process of the invention takes place such that the monomers A to F are reacted under polymerization conditions through to a conversion of ≥95% by weight, advantageously ≥99% by weight, and with particular advantage ≥99.5% by weight. Determining the monomer conversion is familiar to the skilled person and is accomplished more particularly by reaction-calorimetric and/or spectroscopic methods. Frequently it is advantageous if the aqueous polymer P dispersion obtained after the end of the polymerization is subjected to an aftertreatment for the purpose of reducing the residual monomer content. This aftertreatment takes place either chemically, as for example by completion of the polymerization reaction through the use of a more effective free-radical initiator system (referred to as postpolymerization), and/or physically, as for example by stripping of the aqueous polymer P dispersion with steam or inert gas. Corresponding chemical and/or physical methods are familiar to the skilled person [see, for example, EP-A 771328, DE-A 19624299, DE-A 19621027, DE-A 19741184, DE-A 19741187, DE-A 19805122, DE-A 19828183, DE-A 19839199, DE-A 19840586, and 19847115]. The combination of chemical and physical aftertreatment there offers the advantage that not only the unreacted monomers but also other disruptive volatile organic constituents (the so-called VOCs [volatile organic compounds]) are removed from the aqueous polymer P dispersion.

The aqueous reaction medium may in principle also comprise minor amounts (<5% by weight) of water-soluble organic solvents, such as methanol, ethanol, isopropanol, butanols, pentanols, or alternatively acetone, etc. Preferably, however, the process of the invention is carried out in the absence of such solvents.

Besides the aforementioned components, radical chain transfer compounds can also be used, optionally, during the emulsion polymerization, in order to control or reduce the molecular weight of the polymers P available through the polymerization. Use in this case is made substantially of aliphatic and/or araliphatic halogen compounds, examples being n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thiol compounds, such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomers, n-octanethiol and its isomers, n-nonanethiol and its isomers, n-decanethiol and its isomers, n-undecanethiol and its isomers, n-dodecanethiol and its isomers, n-tridecanethiol and its isomers, substituted thiols, such as 2-hydroxyethanethiol, aromatic thiols, such as benzenethiol, ortho-, meta-, or para-methylbenzenethiol, and all further sulfur compounds described in Polymer Handbook $3^{rd}$ edition, 1989, J. Brandrup and E. H. Immergut, John Wiley & Sons, section II, pages 133 to 141, and also aliphatic and/or aromatic aldehydes, such as acetaldehyde, propionaldehyde and/or benzaldehyde, unsaturated fatty acids, such as oleic acid, dienes with nonconjugated double bonds, such as divinylmethane or vinylcyclohexane, or hydrocarbons with readily abstractable hydrogen atoms, such as toluene, for example. Another possibility, though, is to use mixtures of mutually nondisrupting aforementioned radical chain transfer compounds.

The total amount of radical chain transfer compounds used optionally during the emulsion polymerization, based on the total amount of monomer, is generally ≤5%, often ≤3%, and frequently ≤1% by weight.

It is advantageous if a portion or the entirety of the optionally employed, radical chain transfer compound is supplied to the aqueous reaction medium prior to the initiation of the radical polymerization. Furthermore, a portion or the entirety of the radical chain transfer compound may also be supplied to the aqueous reaction medium, advantageously together with the monomers A to F during the polymerization.

The aqueous polymer P dispersions obtainable as a result of the emulsion polymerization of the invention typically have a polymer solids content of ≥10% and ≤70% by weight, frequently ≥20% and ≤65% by weight, and often ≥25% and ≤60% by weight, based in each case on the aqueous polymer dispersion. The number-average particle diameter (cumulant z-average) determined via quasielastic light scattering (ISO standard 13 321) is situated generally in the range of ≥10 and ≤1000 nm, frequently in the range of ≥10 and ≤500 nm and often in the range of ≥50 to ≤250 nm.

It is important that the aqueous polymer P dispersions of the invention can be converted in a simple way (for example, by the freeze-drying or spray-drying methods familiar to the skilled person) into the corresponding polymer P powders.

It is also important that the aqueous polymer P dispersions and/or the corresponding polymer P powders find use as binders in the production of adhesives, sealants, polymeric renders, papercoating slips, fiber nonwovens, and paints, and also in the consolidation of sand, as a component in the production of textile assistants or leather assistants, and impact modifiers, or for modifying mineral binders and plastics. Especially preferred, however, is the use of the aqueous polymer P dispersions and/or the corresponding polymer P powders as binders in the production of tile adhesives.

In the context of the inventive use of the aqueous polymer P dispersions of the invention and/or of the corresponding polymer P powders it is additionally possible to use customary auxiliaries or adjuvants, familiar to the skilled person for the use in question, in nature and amount, such as, for example, thickeners (such as those based on polyacrylates, polyurethanes or polysaccharides, such as Borchigel® L75, Tafigel® PUR 40, Viscalex® HV 30, Walocel® MW 40000, Latekol® D, Latekol® DS 6269), pigment dispersants (such as polymers based on carboxylic acids, such as, for examples, Pigmentverteiler® NL, Pigmentverteiler® MD20, Dispex® N40 or Dispex® G40), dispersant assistants (as described above), biocides (such as chloromethylisothiazolinone, 2-methyl- and 1,2-benzisothiazolinone and also mixtures thereof, such as, for example, Acticid® MV or Acticid® MBS 2550), defoamers (such as mineral oil defoamers and silicone oil defoamers and oxyalkylated compounds, such as, for example, Agitan® 282, Agitan® E255, Byk® 93 or Lumiten® EL), film-forming assistants (such as white spirit, Texanol®, butyldiglycol, dipropylene glycol monobutyl ether (Solvenon® DPnB), tripropylene glycol monobutyl ether (Solvenon® TPnB), butyldiglycol acetate or methyldiglycol), wetting agents (such as 2-aminopropanol, acetylenediols, polyphosphonates), water-soluble organic solvents (such as methanol, ethanol, isopropanol, acetone), pigments (generally finely divided solids with a high opacity and high [>2] refractive index, such as zinc oxide, zinc blende, rutile, anatase) or fillers (generally finely divided solids with a low opacity and a low [<1.7] refractive index, such as calcite, chalk, dolomite, quartz, fumed silica, kaolin, talc, mica, barytes, wollastonite), etc.

With particular advantage the aqueous polymer P dispersions of the invention and/or the corresponding polymer P powders are suitable as binders in tile adhesives.

Tile adhesives of the invention comprise as essential components

≥2% and ≤25% by weight of polymer P,

≥50% and ≤95% by weight of inorganic filler,

≥0.01% and ≤2% by weight of defoamer,

≥0% and ≤4% by weight of thickener, and

≥0.1% and ≤2% by weight of dispersing assistant and/or pigment dispersant, based in each case on the solids content of the tile adhesive.

The tile adhesives produced with the aqueous polymer P dispersions of the invention feature enhanced performance properties as compared with the prior art, such as, more particularly, a prolonged processing life, a greater adhesion of ceramic tiles to surfaces, and an improved shear strength after water storage.

The nonlimiting examples below are intended to illustrate the invention.

EXAMPLES

A) Preparation of the Polymers P in the Form of their Aqueous Dispersions

Comparative Polymer Dispersion C1

A 4 l glass flask equipped with stirrer and 4 metering devices was charged to 20 to 25° C. (room temperature) and under a nitrogen atmosphere with 530 g of deionized water and with 21.2 g of a 33% by weight, aqueous polystyrene seed dispersion (average particle diameter 32 nm), and this initial charge was heated to 85° C. with stirring. When this temperature was reached, 10.0 g of feed 2 were metered in over the course of 5 minutes. Subsequently, beginning simultaneously, the total amount of feed 1 and the remainder of feed 2 were metered in with stirring, the aforementioned temperature being maintained. The remainder of feed 2 was metered in continuously and at a constant flow rate over 3 hours and 15 minutes, while feed 1 was metered in beginning with a metering rate of 2.74 g/min, raised over the course of 15 minutes to 11 g/min, and then subsequently with the constant metering rate of 11 g/min.

Feed 1: aqueous emulsion of

| | |
|---|---|
| 28.0 g | acrylic acid |
| 14.0 g | vinyltriethoxysilane |
| 644 g | styrene |
| 714 g | ethylhexyl acrylate |
| 140 g | a 15% strength by weight aqueous solution of sodium lauryl sulfate (Disponil ® SDS from Cognis GmbH) |
| 5.6 g | a 25% strength by weight aqueous solution of sodium hydroxide |
| 365 g | deionized water |

Feed 2: aqueous solution of

| | |
|---|---|
| 93.3 g | deionized water |
| 7.0 g | sodium persulfate |

The polymerization mixture was then left to postpolymerize at 80° C. for 2 hours, and was cooled to room temperature. A pH of 7.8 was set by addition of 25% strength by weight aqueous sodium hydroxide solution. The aqueous polymer dispersion obtained had a solids content of 51.9% by weight, based on the total weight of the aqueous dispersion. The number-average particle diameter was found to be 176 nm.

The solids contents were determined generally by drying a defined amount of the aqueous polymer dispersion (approximately 0.8 g) to constant weight at a temperature of 130° C. (approximately 2 hours) using the moisture analyzer HR73 from Mettler Toledo. Two measurements were carried out in each case. The figure reported represents the average of these measurements.

The number-average particle diameter of the polymer particles was determined generally by dynamic light scattering on a 0.005 to 0.01 percent by weight, aqueous polymer dispersion at 23° C., using an Autosizer IIC from Malvern Instruments, England. The figure reported is the average diameter of the cumulant evaluation (cumulant z average) of the measured autocorrelation function (ISO standard 13321).

Comparative Polymer Dispersion C2

Comparative polymer dispersion C2 was prepared in the same way as for comparative polymer dispersion C1, except that 14.0 g of 2-hydroxyethyl acrylate instead of 14.0 g of vinyltriethoxysilane were used in feed 1.

The aqueous polymer dispersion obtained had a solids content of 52.0% by weight, based on the total weight of the aqueous dispersion. The number-average particle diameter was found to be 181 nm.

Polymer Dispersion D

Polymer dispersion D was prepared in the same way as for comparative polymer dispersion C1, except that additionally 14.0 g of 2-hydroxyethyl acrylate and also 707 g instead of 714 g of ethylhexyl acrylate and 637 g instead of 644 g of styrene were used in feed 1.

The aqueous polymer dispersion obtained had a solids content of 51.8% by weight, based on the total weight of the aqueous dispersion. The number-average particle diameter was found to be 187 nm.

B) Performance Investigations
B1) Production of the Tile Adhesives

The aqueous polymer dispersions C1, C2, and D were diluted with deionized water to a solids content of 50% by weight. Subsequently the adhesive components indicated in nature and amount were combined in the following sequence, with stirring with a basket stirrer: 17 parts by weight of deionized water, 6 parts by weight of thickener (Viscalex® HV30 from BASF SE), 1 part by weight of defoamer (Lumiten® EL from BASF SE), 300 parts by weight of the aqueous polymer dispersions C1, C2 or D, diluted to 50% by weight, 3 parts by weight of pigment dispersant (Pigmentverteiler® MD20 from BASF SE), 3 parts by weight of thickener (Viscalex® HV30), 453 parts by weight of calcium carbonate filler (Omyacarb® 40 GU from Omya), 217 parts by weight of calcium carbonate filler (Omyacarb® 130 GU from Omya). The formulations obtained were then stirred for 15 minutes more. The tile adhesives thus produced, TAC1, TAC2, and TAD, were stored in a sealed container at room temperature for at least 24 hours prior to testing.

B2) Performance Tests
a) Testing of Shear Strength After Water Storage

The test was based upon DIN EN 1324. With the aid of a stencil (see DIN EN 1324, section 6.1), tile adhesive TAC1, TAC2 or TAD was applied to the unglazed reverse of a P2 test tile with facing-side dimensions of 108 mm×108 mm, and was drawn down cleanly, so that all of the holes in the stencil were completely filled. The stencil was then lifted, and a spacer with a thickness of 0.8 mm was placed in each corner of the tile. After 2 minutes, a second test tile was placed by the unglazed reverse onto the coated tile in such a way as to achieve an overlap of the tiles with a displacement by 6 mm. The overlapping area of the resultant test specimen was subsequently loaded with a 7 kg weight for 3 minutes, and then the spacers were removed. For each tile adhesive, 5 test specimens were produced and were stored first for 7 days at 23° C. and 50% relative humidity (standard conditions) and thereafter for 7 days at room temperature horizontally under water. The test specimens were subsequently taken from the water, padded dry with a cotton cloth and tested in a Zwick pressure testing machine with an apparatus for the shear test. The measurements were carried out in each case with a shear rate of 5 mm per minute until fracture occurred. The higher the shearing force in $N/mm^2$ on fracture, the better the shear strength. The shear strengths on fracture that are reported for the individual tile adhesives in table 1 represent the average of the 5 measurements.

b) Testing of the Open Time

The test was based on DIN EN 1346. First of all a thin layer of the corresponding tile adhesive, TAC1, TAC2 or TAD, was applied to a concrete plate 3.7 cm thick (in accordance with EN 1323). Then a thicker layer was applied using a toothed applicator, with a tooth size of 6 mm×6 mm and a middle spacing of 12 mm. After times of 5 minutes, 10 minutes, 20 minutes, and 30 minutes for evaporation, 5 P1 test tiles with facing-side dimensions of 50 mm×50 mm were each inserted into the adhesive, at a distance of 35 mm from one another, and each tile was loaded for 30 seconds with a 2 kg weight. Thereafter the concrete plate with the tiles bonded to it was stored under standard conditions for 13 days. After that, tensile anchor plates were adhered to the tiles using an epoxy resin adhesive (Ardex® WA from Ardex). After further storage for 24 hours under standard conditions, the tensile adhesive strength of the tile adhesives was determined by application of a force which increased at a constant rate of 250 N per second until the tile broke away. The higher the force in $N/mm^2$ on breakaway of the tile, the better the tensile adhesive strength. The figures reported in table 1 represent in each case the averages of the tensile adhesive strengths obtained with the 5 test tiles.

c) Testing of the Tensile Adhesive Strength After 16 Hours

The test was based on DIN EN 1348. In preparation for the test, tensile anchors were bonded using an epoxy resin adhesive (Ardex® WA from Ardex) to the C1 test tiles with facing-side dimensions of 50 mm×50 mm, and these assemblies were left to dry for at least 24 hours prior to use. For producing the test specimens, first of all a thin layer of the adhesive was applied to an Eterplan® plate 8 mm thick from Eternit. Then a thicker layer of the adhesive was applied using a toothed applicator with a tooth size of 6 mm×6 mm and with a central spacing of 12 mm. After a time of 5 minutes for evaporation, 5 of the above-prepared test tiles were inserted into the respective tile adhesive with a distance of 10 mm from one another, and each tile was loaded with a 2 kg weight for 30 seconds. Subsequently the Eterplan® plate with the tiles bonded to it was stored under standard conditions for 16 hours. The tensile adhesive strength of the tile adhesives was thereafter determined by application of a force which increased at a constant rate of 250 N per second until the tile broke away. The higher force in N/mm² on breakaway of the tile, the better the tensile adhesive strength. The figures reported in table 1 represent in each case the averages of the tensile adhesive strengths obtained with the 5 test tiles.

TABLE 1

Results of shear strength after water storage, open time, and tensile adhesive strength after 16 hours

| Tile adhesive | | TAC1 | TAC2 | TAD |
|---|---|---|---|---|
| Shear strength after water storage [N/mm²] | | 0.76 | 0.29 | 1.06 |
| Tensile adhesive strength after 16 hours [N/mm²] | | 0.09 | 0.08 | 0.13 |
| Tensile adhesive strength [N/mm²] with an open time of | 5 minutes | 0.98 | 1.28 | 1.36 |
| | 10 minutes | 0.47 | 0.97 | 1.14 |
| | 20 minutes | 0.37 | 0.47 | 0.78 |
| | 30 minutes | 0.32 | 0.15 | 0.67 |

From the results it is clearly apparent that the tile adhesive TAD, produced using the polymer P of the invention, exhibits improved shear strength after water storage, improved tensile adhesive strength after 16 hours, and a significantly prolonged processing life in comparison to the noninventive tile adhesives TAC1 and TAC2.

The invention claimed is:

1. A process for preparing an aqueous dispersion of a polymer P by radically initiated aqueous emulsion polymerization of ethylenically unsaturated compounds, the process comprises radically initiated aqueous emulsion polymerization of a monomer composition comprising:
   from 0.1% to 5.0% by weight of at least one α,β-monoethylenically unsaturated $C_3$ to $C_6$ monocarboxylic or dicarboxylic acid and/or at least one α,β-monoethylenically unsaturated $C_3$ to $C_6$ monocarboxamide or dicarboxamide (monomers A),
   from 0.1% to 5.0% by weight of at least one monoethylenically unsaturated compound containing silane groups (monomers B),
   from 0.1% to 5.0% by weight of at least one hydroxyalkyl acrylate and/or hydroxyalkyl methacrylate (monomers C),
   from 0% to 5.0% by weight of at least one crosslinking monomer having at least two nonconjugated ethylenically unsaturated groups (monomers D),
   from 30% to 75% by weight of at least one ethylenically unsaturated monomer which homopolymer has a glass transition temperature of ≤30° C. (monomers E) and which differs from the monomers A to D, and
   from 20% to 69.7% by weight of at least one ethylenically unsaturated monomer which homopolymer has a glass transition temperature of at least 50° C. (monomers F) and which differs from the monomers A to D,
   wherein the amounts of the monomers A to F add up to 100% by weight.

2. The process according to claim 1, wherein the at least one monomer E is selected from the group consisting of a conjugated aliphatic $C_4$ to $C_9$ diene compound, ester of vinyl alcohol and a $C_1$ to $C_{10}$ monocarboxylic acid, $C_1$ to $C_{10}$ alkyl acrylate, $C_5$ to $C_{10}$ alkyl methacrylate, $C_5$ to $C_{10}$ cycloalkyl acrylate and methacrylate, $C_1$ to $C_{10}$ dialkyl maleate, and $C_1$ to $C_{10}$ dialkyl fumarate, and the at least one monomer F is selected from the group consisting of a vinylaromatic monomer and $C_1$ to $C_4$ alkyl methacrylate.

3. The process according to claim 1 or 2, wherein the monomer B is selected from the group consisting of vinyltriacetoxysilane, 3-methacryloyloxypropyltrimethylsilane, and vinyltriethoxysilane, and the monomer C is selected from the group consisting of diethylene glycol monoacrylate, 4-hydroxybutyl acrylate, 3-hydroxypropyl acrylate, 2-hydroxypropyl acrylate, 2-hydroxyethyl acrylate, diethylene glycol monomethacrylate, 4-hydroxybutyl methacrylate, 3-hydroxypropyl methacrylate, 2-hydroxypropyl methacrylate, and 2-hydroxyethyl methacrylate.

4. The process according to claim 1, wherein the monomer composition comprises:
   from 0.5% to 3.0% by weight of at least one monomer A,
   from 0.5% to 2.0% by weight of at least one monomer B,
   from 0.5% to 3.0% by weight of at least one monomer C,
   from 0% to 1.0% by weight of at least one monomer D,
   from 40% to 65% by weight of at least one monomer E, and
   from 30% to 58.5% by weight of at least one monomer F.

5. The process according to claim 1, wherein the monomer composition comprises:
   from 1.0% to 2.5% by weight of at least one monomer A,
   from 0.5% to 0.5% by weight of at least one monomer B,
   from 0.5% to 2.0% by weight of at least one monomer C,
   from 0% to 1.0% by weight of at least one monomer D,
   from 45% to 60% by weight of at least one monomer E, and
   from 30% to 53% by weight of at least one monomer F.

6. The process according to claim 1, wherein the monomers A, B, C, E, and F and their amounts are selected such that a polymer prepared from the monomers A, B, C, E, and F has a glass transition temperature of from −20 to 30° C.

7. An aqueous polymer dispersion prepared by the process of claim 1.

8. A polymer powder prepared by drying the aqueous polymer dispersion of claim 7.

9. A process for production of adhesives, sealants, polymeric renders, papercoating slips, fiber nonwovens, and paints, for sand consolidation, for the production of textile assistants or leather assistants, and impact modifiers, or for modifying mineral binders and plastics, wherein the improvement comprises adding the aqueous polymer dispersion of claim 7.

10. A process for production of tile adhesives, wherein the improvement comprises adding the aqueous polymer dispersion of claim 7 as a binder.

11. A tile adhesive, wherein a solids content of the tile adhesive consists essentially of:
   from 2% 25% by weight of polymer P produced by the process of claim 1 or 2,
   from 50% 95% by weight of an inorganic filler,
   from 0.01% 2% by weight of a defoamer,
   from 0% 4% by weight of a thickener, and
   from 0.1% 2% by weight of a dispersing assistant and/or a pigment dispersant,
   based in each component on the solids content of the tile adhesive.

12. A process for the production of adhesives, sealants, polymeric renders, papercoating slips, fiber nonwovens, and paints, for sand consolidation, for the production of textile assistants or leather assistants, and impact modifiers, or for modifying mineral binders and plastics, wherein the improvement comprises adding the polymer powder of claim 8.

13. A process for the production of tile adhesives, t wherein the improvement comprises adding the polymer powder of claim 8 as a binder.

14. The process according to claim 1, wherein the monomers are metered in the form of a monomer mixture.

15. The process according to claim 14, wherein the monomers are metered in the form of an aqueous monomer emulsion.

* * * * *